May 23, 1939.  H. P. HARRISON  2,159,084
WHEEL-ALIGNING GAUGE
Filed May 23, 1938   2 Sheets-Sheet 1
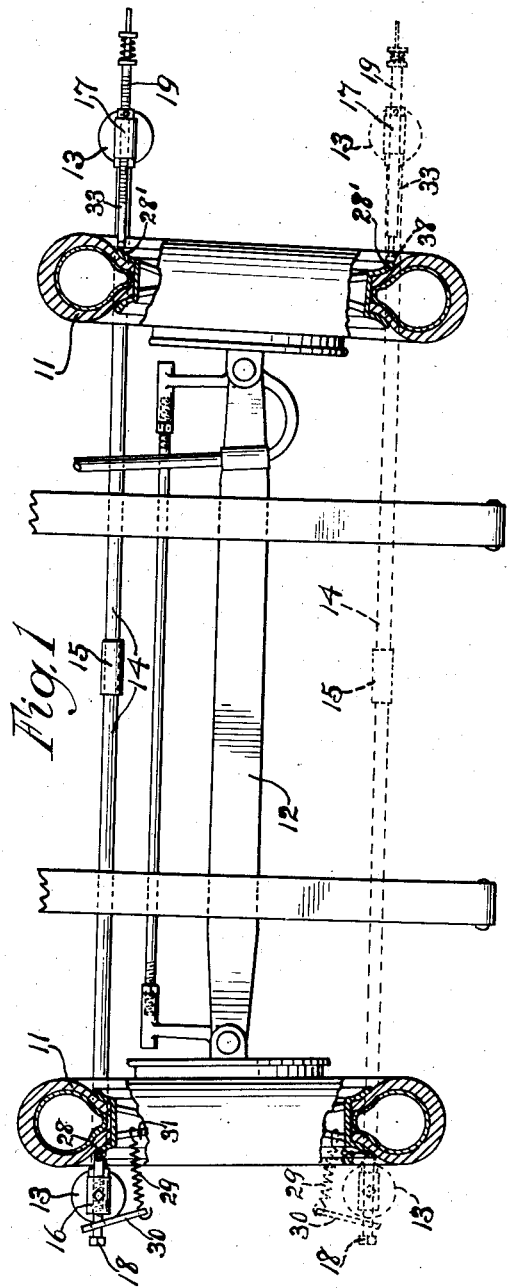
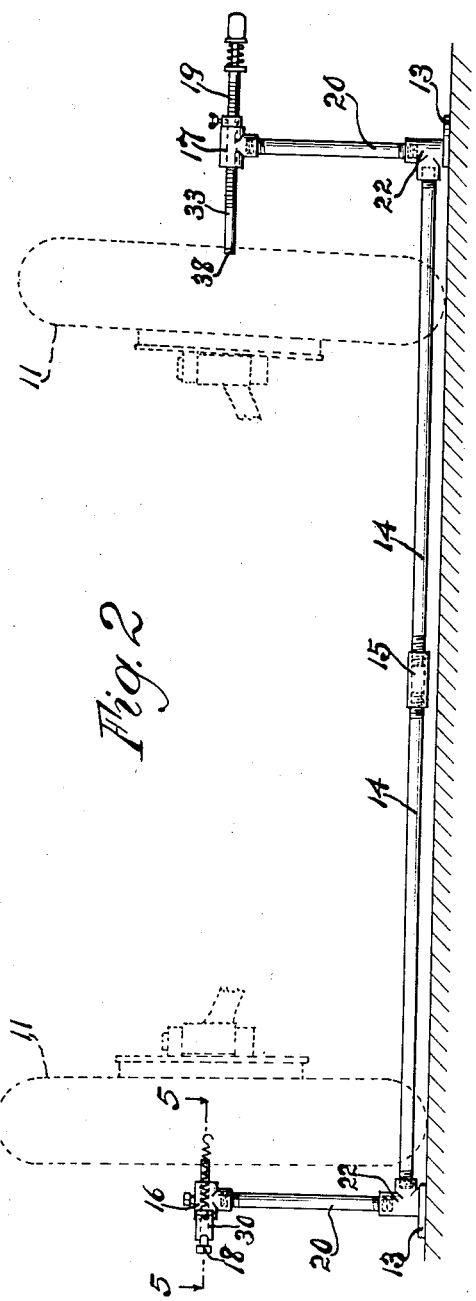
Inventor
Harry P. Harrison
by J. Daniel Stuwe
Attorney.

May 23, 1939.  H. P. HARRISON  2,159,084
WHEEL-ALIGNING GAUGE
Filed May 23, 1938  2 Sheets-Sheet 2
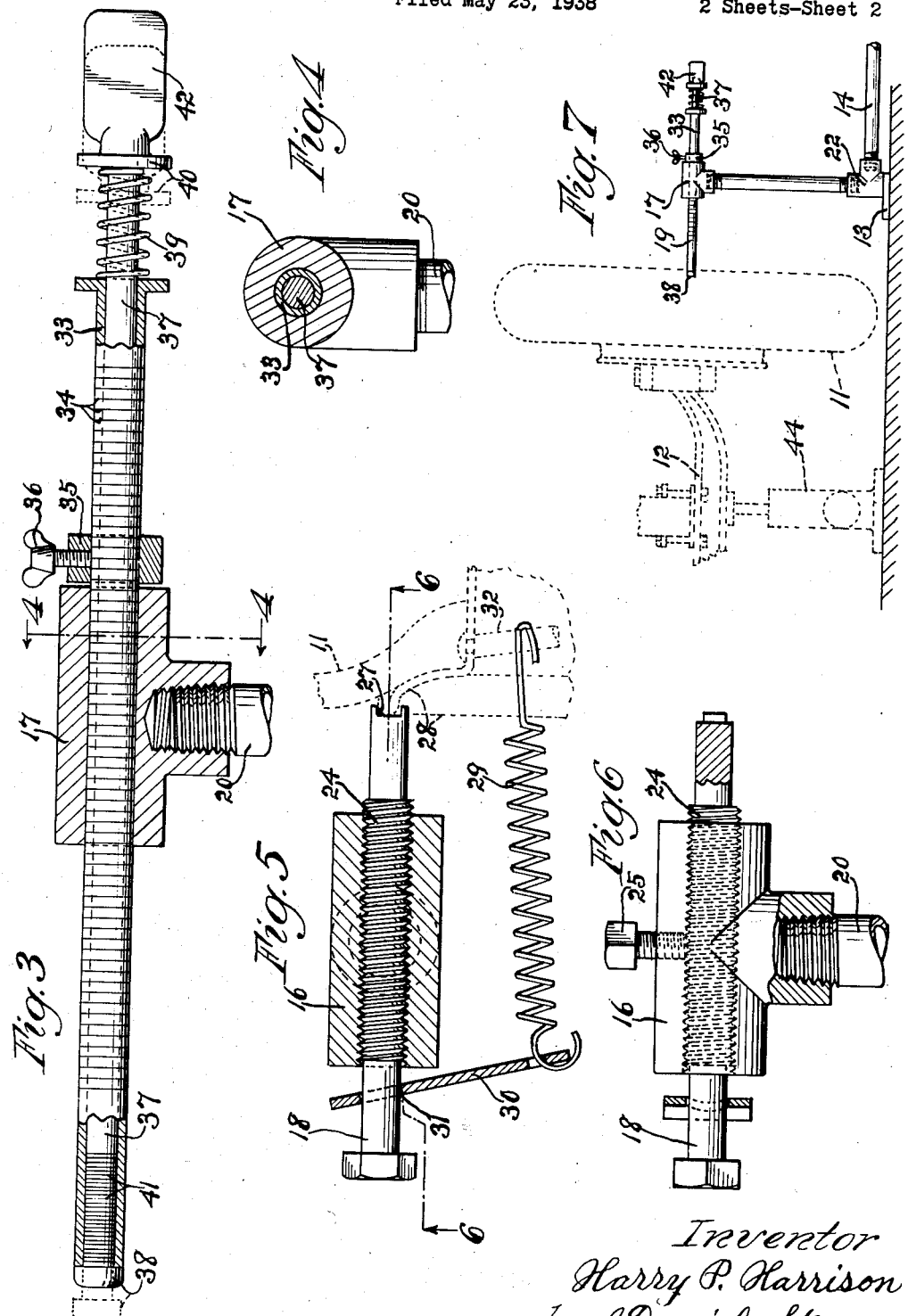
Inventor
Harry P. Harrison
by J. Daniel Stuwe
Attorney Patented May 23, 1939

2,159,084

UNITED STATES PATENT OFFICE 2,159,084

WHEEL-ALIGNING GAUGE

Harry P. Harrison, Chicago, Ill., assignor of one-half to Irving L. Wiener, Chicago, Ill.

Application May 23, 1938, Serial No. 209,465

8 Claims. (Cl. 33—203)

This invention relates to novel improvements in a wheel aligning gauge.

One of the main objects of this invention is to provide an economical gauge which is conveniently operable in testing and aligning the wheels of an automobile or similar motor car for "toe in" or "gather" and for truing the wheels and the like.

Another object of this invention is to provide a wheel aligning gauge which can be conveniently manipulated and may be installed and operated from the side of the motor car, without any necessity of getting under the car or getting dirty.

Another object of this invention is to provide such a gauge which has its various parts arranged so that they may be readily detached and packed together in a small parcel, to facilitate storage and shipment thereof.

Another object of this invention is to provide such a gauge by using many parts of standard construction, so as to greatly reduce the cost of manufacture.

These and various other objects and advantages are attained with this invention, as will become apparent from the following description, taken in connection with the accompanying drawings in which this invention is illustraited in its preferred form of construction; it being understood that various other arrangements and forms of construction may be resorted to for carrying out the objects and purposes of this invention.

In the drawings:

Fig. 1 is a plan view illustrating this invention in its operative position, for testing and gauging the "toe in" or "gather" of the pair of front wheels of an automobile.

Fig. 2 is an elevational view thereof, as applied to said wheels.

Fig. 3 is a view of the movable gauge member, with parts shown in section.

Fig. 4 is a cross-sectional view thereof, taken on line 4—4 of Fig. 3.

Fig. 5 is an enlarged horizontal sectional view of the stationary gauge member, taken on line 5—5 of Fig. 2.

Fig. 6 is an elevational view of the stationary gauge member, taken along line 6—6 of Fig. 5.

Fig. 7 is an elevational view illustrating the use of this invention for testing a wheel for trueness.

For the purpose of illustration I have herein disclosed my invention in its preferred form of construction, and it is arranged so that it can be conveniently set up in its operative position under the pair of wheels, and the wheels can be tested, without any need of getting under the car or getting dirty.

This illustrated form of construction comprises a pair of standards or supporting posts 20, which are adapted to be placed adjacent the outward sides of a pair of wheels 11, illustrated in the drawings as a pair of front wheels of an automobile 12, which are to be tested and aligned for toe in. Said standards are provided at their lower ends with suitable feet or base members 13 to retain them in upright position.

A cross bar 14 connects the standards 20, to retain them properly spaced and stationary. Said bar preferably has its ends detachably connected to the standards, to facilitate separation of the parts for convenient packing and shipping; and the bar is preferably also made in two parts detachably connected by a sleeve or threaded means 15 at the center. This facilitates detaching and stacking the parts together into a small parcel, and it also provides for adjusting the parts for length, to effect the proper and desired distance between the standards in their operative position.

The pair of standards are provided with supporting members 16 and 17 at their upper ends for supporting the pair of gauge members 18 and 19 thereon. These standards, including said upper supporting members 16 and 17, are economically made by using a pair of T-pipes for said members, and a pair of lengths of pipes 20 which have their upper ends threaded into the depending branches of the pair of T-pipes; also using a pair of L-pipes 22, into the upper branches of which the pipes 20 are threaded, as indicated in Fig. 2, while the cross bar 14 preferably has its ends threaded into the horizontally extending branches of the L-pipes, as indicated in the drawings.

With this construction the threaded connections between the pipes 20 and the T's and the L's, enables adjusting the parts to provide the desired elevation for the brackets 16 and 17 and the gauge members 18 and 19 supported therein; and the threaded connections of bar 14 enables adjusting the distance between the standards 20 with their brackets 16 and 17; to suit the particular pair of wheels to be tested; while the gauge members 18 and 19 can be readily removed from the brackets 16, 17, and the crossbar sections 14 likewise detached from the L's 22, and separated at 15, so as to be stacked together into a small parcel, at the same time providing an economical construction.

The stationary gauge member 18 is made adjustable in bracket 16, and it is substantially in the shape of a bolt or rod which has a part 24 threaded in said bracket, as best shown in Fig. 5, while a set screw 25 in the bracket is adapted to retain the bolt stationary. It has a notched inner end 27 adapted to engage the outward edge of the rim 28 of wheel 11, to be securely held in position thereon; and a spring 29 is connected with the bolt, preferably by a clamp plate 30 hooked at one end to the spring and having the bolt clamped in an opening 31 in its other end; while the free end of the spring is hooked onto a spoke 32 of the wheel.

The movable gauge member 19 preferably comprises a main outer member 33 which is tubular and has suitably spaced graduations 34 on its exterior. It fits closely but slidably in the bracket 17, being freely movable outwardly thereon away from the wheel, but it is limited in its inward movement by means of a collar 35 adjustably fastenable on said outer member by a set screw 36. An inner member 37, in the shape of a rod, is slidably mounted in said tubular outer member 33, and has a head 38 secured on its inward end, adapted to engage the outward edge of the wheel rim 28', which is opposite wheel rim 28, while a spring 39 is seated on the outward end of rod 37, between the outer end of sleeve 33 and a flange 40 on said rod, whereby said head 38 is drawn against the inner end of sleeve 33. Graduations 41 on the rod, near head 38, may be read when the rod is pressed inwardly by bearing on its handle 42, against the action of spring 39. This rod or inner gauge member 37 is thus limited in its outward movement in the sleeve, but is resiliently movable inwardly therein to expose the graduations 41 for testing the toe in of the wheels.

In using this gauge device, as for instance for testing the pair of front wheels of an automobile for toe in, the device is conveniently installed from one side of the automobile, underneath the same, and is preferably first set up under the rear part of the front wheels. The stationary gauge member 18 is then adjusted to have its slotted end 27 engage the outward edge of the rear part of the wheel rim 28, and is secured in position with set screw 25, while spring 29 is hooked onto spoke 32, thus securing this gauge member in position. The adjustable gauge member 19 is then set in position, with its head 38 engaging the outward edge of the rear part of the wheel rim 28', opposite rim 28 on the opposite wheel; whereupon the collar 35 is moved against bracket 17 and is secured on sleeve 33 by set screw 36, thereby limiting the inward movement of sleeve 33 but enabling the outward movement thereof from bracket 17. This is indicated in full lines in Fig. 1. Thereupon the gauge device is withdrawn and is placed in position under the front part of said wheels, and the stationary gauge member 18 secured in position, with the slotted end 27 in engagement with the outward edge of the forward part of wheel rim 28, in the manner outlined above, and the movable gauge member 19 is brought into position with head 38 adjacent the outward edge of the forward part of wheel rim 28', as indicated by the broken lines in Fig. 1. The inner member or rod 37 is then moved inwardly, by pressing handle 42 against the resistance of spring 39 until head 38 engages the rim 28'. The graduations 41 exposed on the inner end of said rod 37, as indicated by the broken lines in Fig. 1, will then indicate the toe in of the wheel. The customary allowance of toe in or gather is between $\frac{1}{16}$" and $\frac{1}{8}$"; and the graduated means 41 on rod 37, between head 38 and the inner part of sleeve 33 will thus readily indicate any wrong amount of toe in or gather that requires correction.

This device is likewise adapted to test the wheels for truing the same, as indicated in Fig. 7 of the drawings, whereby the adjustable gauge member 19 is preferably reversed in its bracket 17 and collar 35 set against bracket 17 by set screw 36, with head 38 engaging the wheel rim. The wheel is elevated, by the use of a jack 44 or the like, and is then spun. The depressions or low spots of the wheel are indicated by graduations 41 on the inner gauge member 37; while the high spots on the wheel rim are indicated by the outward movement of the outer gauge member 33 and its graduations 34, shown between said collar 35 and the bracket 17.

This form of construction provides a very practical and economical and conveniently operable gauge device of this type for testing toe in and the like, wherein the various parts can be properly adjusted and which can also be readily disassembled and stacked together in a small parcel, for shipment and to store it out of the way.

I claim:

1. A wheel aligning gauge comprising a pair of standards provided with base means thereunder for supporting them upright, cross means having its ends detachably connected to said standards to retain them properly spaced, a bracket on each standard, a gauge member and means for mounting it stationary but adjustable on the bracket of one of said standards adapted to engage a rim of a pair of wheels, and a graduated gauge member and means for mounting it movably on the bracket of the other standard and provided with means to limit its movement in one direction relative to the standard and the associated wheel, also graduated means mounted in said graduated gauge member being movable longitudinally thereof and provided with resilient means to hold it against movement in one direction relative to said standard and wheel.

2. A wheel aligning gauge comprising a pair of standards provided with supporting means thereon and a cross bar having its ends detachably connected with the standards to retain them in proper position at the outward sides of a pair of wheels, a pair of gauge members, means to retain one of them stationary on one standard, and in engagement with a wheel and including holding means engaging said wheel for securing said gauge member firmly thereon, the other gauge member including means movable outwardly on its standard away from the wheel and being graduated for measuring the high spots of the wheels, and graduated means carried by the last said means and movable inwardly thereof toward the wheel in gauging the toe in of said wheels.

3. A wheel aligning gauge comprising a pair of standards and means connecting them to place and retain them in proper position at the sides of a pair of wheels, a pair of gauge members, one of which is retained adjustably but stationary on one of the standards, the other gauge member including a main member movably supported on the other standard and having adjustable means thereon for limiting its movement on the standard toward the associated wheel, and means resiliently held in its outer position on said main member but being movable toward the associated wheel in gauging the toe in of the wheels.

4. A wheel aligning gauge comprising a pair of standards provided with base means at the bottom and supporting brackets at the top, means connecting the standards to retain them in proper position at the outer sides of the wheels, a pair of gauge members adapted to engage a pair of wheel rims, means for retaining one gauge member stationary but adjustable on its bracket, the other gauge member including a main graduated member movable outwardly on its bracket away from the wheel and having means adjustable thereon to limit its movement toward the wheel, a graduated member carried by said main member having a handle to move it toward the wheel, and means for resiliently retaining the last said member in its outer position relative to said main member.

5. A wheel aligning gauge comprising a pair of standards provided with base means at the bottom and supporting brackets at the top, a cross rod detachably connected to the standards to retain them in proper position at the sides of the wheels, a pair of gauge members, means for retaining one gauge member stationary but adjustable on its supporting bracket, the other gauge member including an outer graduated tubular member movable on its bracket and having means adjustably secured thereon to limit its movement toward the wheel, also an inner graduated rod member carried in said outer tubular member and being slidable therein toward the wheel, and spring means on the inner rod member for resiliently retaining it in its retracted position.

6. A wheel aligning gauge comprising a pair of standards provided with supporting brackets thereon, means connecting said standards to retain them in operative position, a pair of gauge members, graduated means on one of said members and means for retaining it movably on one of said brackets, the other gauge member including a rod adjustable in its bracket and having a notched inner end to engage the wheel rim, means to secure the rod stationary in its bracket, and means connected with the rod to hook onto a spoke of the wheel for retaining the gauge member in position.

7. The subject matter set forth in claim 6, wherein the rod is threaded in the bracket and a clamp plate embraces the rod and has a spring extending therefrom to engage a spoke of the wheel.

8. A gauge device for testing a pair of automobile wheels for toe in and the like, said device comprising a pair of standards and a pair of gauge members adjustably supported at their upper ends also means detachably connected with the standards for retaining them in place adjacent the outer sides of the wheels, means for retaining one of the gauge members stationary but adjustably supported on its standard, means to retain said gauge member in firm engagement with the outer side of the rim of one wheel, the other gauge member including a graduated main member supported on its standard and having means adjustable thereon to limit movement inwardly thereon toward its wheel and allow movement outwardly on the standard, and a graduated gauge member carried by said main member being held resiliently in place to be movable thereon and including a head adapted to engage the outer side of the rim of the opposite wheel, whereby said gauge device is adapted to be conveniently installed and operable from the side of the automobile and is also separable to be stacked into a slender parcel.

HARRY P. HARRISON.